United States Patent [19]
Tatsumi et al.

[11] 3,739,244
[45] June 12, 1973

[54] VARIABLE CONDENSER

[75] Inventors: Toshio Tatsumi, Daito; Hideo Kitani, Kobe; Hideo Maruoka, Higashi, Osaka, all of Japan

[73] Assignee: Matsushita Electric Industrial Co., Ltd., Osaka, Japan

[22] Filed: Oct. 26, 1971

[21] Appl. No.: 192,185

[30] Foreign Application Priority Data
Oct. 30, 1970 Japan............................. 45/108399

[52] U.S. Cl................................. 317/253, 29/25.41
[51] Int. Cl............................................ H01g 5/06
[58] Field of Search....................... 317/253, 254; 308/233; 29/25.42, 25.41

[56] References Cited
UNITED STATES PATENTS

| | | | |
|---|---|---|---|
| 1,895,540 | 1/1933 | Cohen | 308/233 |
| 1,984,464 | 12/1934 | Cohen | 308/233 |
| 3,204,163 | 8/1965 | Halftermeyer | 317/253 X |

FOREIGN PATENTS OR APPLICATIONS

| | | | |
|---|---|---|---|
| 634,827 | 5/1936 | Germany | 317/253 |
| 210,030 | 1/1924 | Great Britain | 317/253 |
| 618,799 | 2/1949 | Great Britain | 317/253 |

*Primary Examiner*—E. A. Goldberg
*Attorney*—Richard K. Stevens, Davidson C. Miller and Robert J. Frank et al.

[57] ABSTRACT

A variable condenser comprising a frame having a cutout formed in one side wall for providing a bearing portion at an extension thereof, a rotor shaft having a bearing adapted to be received by said bearing portion to support the rotor shaft, said cutout being used to assemble the rotor shaft in the frame, rotor blades secured to the rotor shaft, and stator blades co-operative with the rotor blades and secured to said frame.

3 Claims, 8 Drawing Figures

FIG. I PRIOR ART
FIG. 2 PRIOR ART
FIG. 3
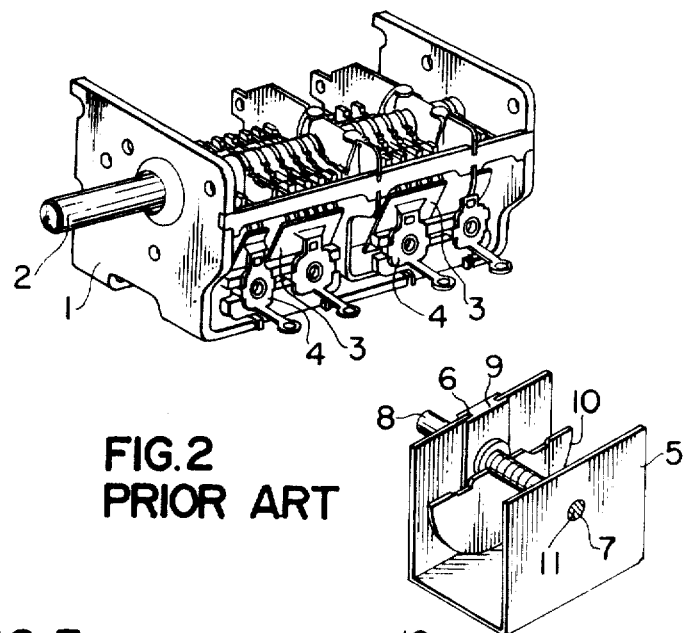
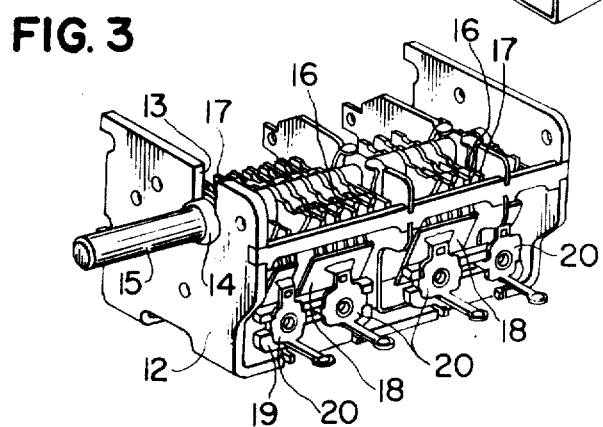

VARIABLE CONDENSER

The present invention relates to a variable condenser, and more particularly to a variable condenser which can be assembled with a remarkably simplified process and a high productivity as compared with a conventional one.

In a typical known variable condenser, it has been a common practice to insert a rotor shaft through side walls of a frame, then insert a stator carrying a plurality of stator blades into the frame so that the stator blades are located at alternated positions with rotor blades carried on the rotor shaft, thereafter adjust air gaps between the stator and rotor blades, and finally connect the stator to a terminal element. This conventional process has to be carried out manually and required increased skill and labor.

In order to overcome this problem, it has been proposed to provide a cutout on one of the side walls in the frame for receiving a bearing on the rotor shaft. With this arrangement, it is possible to assemble a variable condenser by placing a subassembly of a stator and a rotor on a jig and thereafter putting a frame in position. Although this arrangement has been effective to simplify the assembling process, it has not been preferable since a plane bearing has been used for supporting the rotor shaft. A plane bearing is not preferred for a variable condenser in which least play of the rotor shaft is allowed. Further, there has been a problem in securing the plane bearing to the frame.

The present invention has an object to eliminate the aforementioned problems encountered in conventional variable condensers.

A further object of the present invention is to provide a novel structure of a variable condenser which can be assembled with a remarkably simplified process and with a minimum time and labor.

The above and other objects and features of the present invention will become apparent from the following descriptions of a preferred embodiment taking reference to the accompanying drawings, in which;

FIG. 1 is a perspective view of a conventional variable condenser;

FIG. 2 is a fragmentary perspective view of another variable condenser of a known type;

FIG. 3 is a perspective view of a variable condenser showing one embodiment of the present invention;

Figure 4:
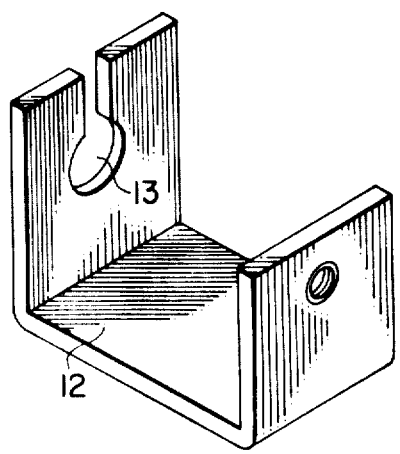
FIG. 4 is a perspective view of a frame used in the variable condenser shown in FIG. 3.

Referring to the drawings, particularly to FIG. 1 which shows a conventional variable condenser, the reference numeral 1 shows a frame, 2 a rotor shaft, 3 stators and 4 terminal elements. In assembling the variable condenser of the type shown in FIG. 1, the rotor shaft 2 is first of all inserted into the frame 1 and thereafter a push screw on the rear side of the frame 1 is tightened to apply a predetermined frictional resistance to the rotor shaft 2. Then, the stators 3 are put into position by moving them around the rotor shaft, and thereafter air gaps between stator blades and rotor blades. Finally, the stators 3 are connected to the terminal elements. As previously described, this arrangement is disadvantageous in that all of the assembling operations such as the insertion of the rotor shaft 2 into the frame 1, the insertion of each stator 3, the adjustment of air gaps between the stator and rotor blades, the work for connecting the terminal elements 4 and the stators 3 must be performed manually and it has not been possible to perform these operations by using a jig. Thus, a highly skilled labor has been required to assemble the variable condenser of this type, therefore much time has been required and the productivity thereof has been low.

In order to eliminate this problem, it has been proposed to provide a variable condenser including a frame having a cutout for inserting a rotor shaft as shown in FIG. 2. Referring to FIG. 2, the reference numeral 5 shows a frame, 6 a cutout formed in one of side walls of the frame 5, 8 a rotor shaft, 9 a plane bearing, 10 a rotor blade, and 11 a pivot shaft pusher which is adapted to be screwed into a threaded hole 7 in the other of the side walls of the frame 5 for holding the corresponding end of the rotor shaft. This arrangement can simplify the assembling operation of the variable condenser in that preassembled stator and rotor are placed on a jig, then a frame is lowered thereon to be put into position, and thereafter a pivot shaft pusher 11 is inserted into position to apply a predetermined friction to the shaft 8. However, in this arrangement, the plane bearing 9 is not preferable in view of preciseness for use in a variable condenser in which least play of the rotor shaft 8 is allowed. Further, there is also a problem in securing the bearing 9 to the frame 5.

The present invention is aimed to eliminate the aforementioned disadvantages of conventional arrangement and to make it possible to assemble a variable condenser by using a jig with a minimum time and labor. A preferred embodiment is shown in FIG. 3 in which the reference numeral 12 shows a frame having a cutout 13 in the shape of a key-hole formed in one of side walls thereof. A rotor shaft 15 having a bearing 14 is received in the cutout 13. The rotor shaft 15 carries rotor blades 16 which co-operate with stator blades 17 secured to the frame 12. A predetermined number of stator blades 17 are connected together to form a stator block by means of a stator holder plate 18 which is in turn connected to a terminal element 20 provided on an insulating base 19 secured to a side edge of the frame 12.

The other end of the rotor shaft 15 is supported by a pusher screw inserted into the other side wall of the frame 12.

FIG. 4 shows the detail of the frame 12 embodying the present invention. The cutout 13 for receiving the bearing 14 is of a key-hole shape that has a straight entrance portion which is smaller in width than the diameter of the circular portion with which the bearing 14 engages. The width of the straight entrance portion is so determined that it allows the rotor shaft to pass therethrough.

Figure 5:
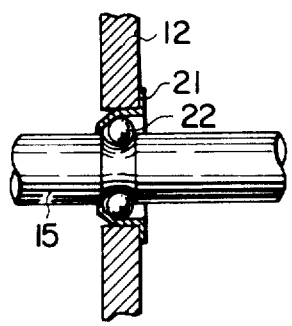
FIG. 5 is a fragmentary sectional view showing a rotor shaft bearing in the variable condenser shown in FIG. 3.
Figure 6:
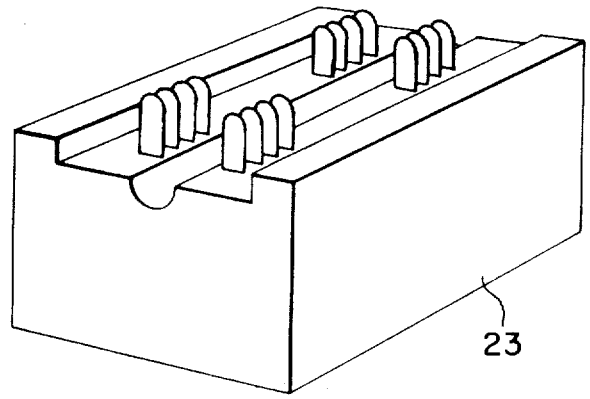
FIG. 6 is perspective view of a jig which is used for assembling the variable condenser of the present invention.
Figure 7:
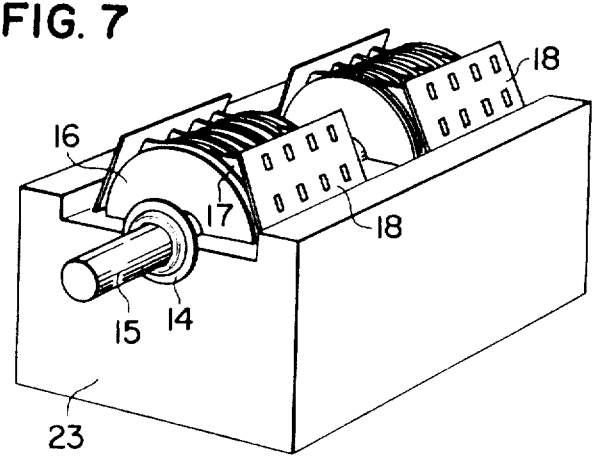
FIG. 7 is a perspective view of the jig in FIG. 6 showing the jig when in use.
Figure 8:
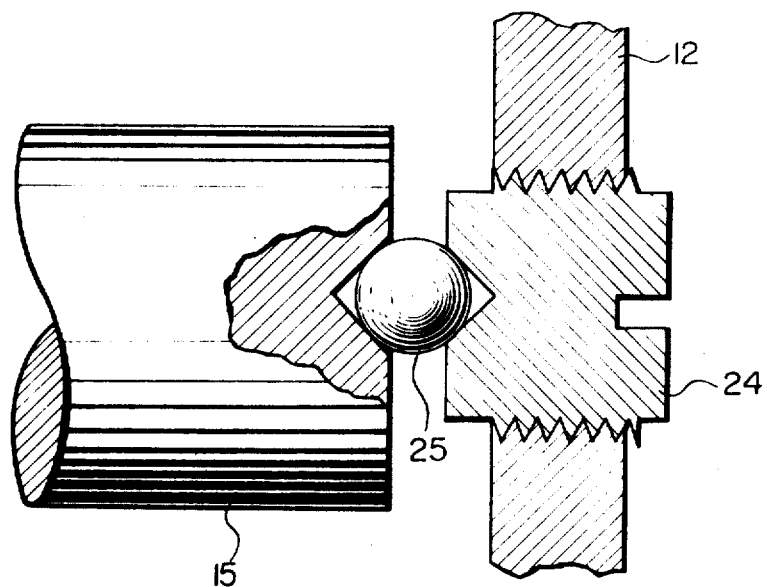
FIG. 8 is a fragmentary sectional view showing the details of a pusher screw.

FIG. 5 shows the frame 12, the bearing 14 which includes an outer bearing race 21 and bearing balls 22, and the rotor shaft 15 in an assembled position. By pushing the rotor shaft 15 in the leftward direction as seen in FIG. 5 by means of a pusher screw 24 inserted into the aperture of the frame 12, the outer race 21 is forced into the circular portion of the cutout 13 to be retained therein. The pusher screw 24 engages the opposite end of the rotor shaft 15 through a ball 25. Therefore, it is not required to provide a particular means for retaining the bearing outer race 21 in the position. In assembling the variable condenser having a frame 12 is shown in FIG. 4, it is possible to use a jig 23 such as the one shown in FIG. 6. A rotor shaft 15 carrying rotor blades 16 thereon and stator blades 17 are placed on the jig 23 as shown in FIG. 7 with correct air gaps between the stator blades 17 and the rotor blades 16, then the frame 12 is lowered into place. Thereafter, a pusher screw 24 is inserted from the side of the frame 12 remote from the bearing 14 and finally the stator holder plates 18 are connected to corresponding terminal elements 20. Thus, a highly precise assembly of a variable condenser can be obtained.

From the above, it will be apparent that the present invention provides a unique variable condenser which can be assembled with less manual operation as compared with a conventional one. It should further be noted that the variable condenser of the present invention still retains advantageous features of a known one and is practically useful.

We claim:

1. A variable condenser, comprising:

a frame having a slot formed in one side wall perpendicular to the bottom face thereof and having a bearing portion formed therein in open communication with said slot;

a rotor shaft having at least one rotor blade mounted thereon and having a bearing mounted on said shaft adjacent one end thereof, said bearing being adapted to be set into said bearing portion;

means mounted on the opposite side wall of said frame for exerting a force on the end of said shaft opposite said one end to set and hold said bearing in said bearing portion; and stator blades mounted on said frame in spaced relation to said at least one rotor blade.

2. The variable condenser according to claim 1, wherein said bearing portion and slot form a keyhole-shaped opening, said bearing portion having a diameter greater than the width of said slot; and the means for exerting a force on the end of said shaft comprises a pusher screw mounted in an opening in said opposite side wall.

3. A method for assembling a variable condenser having a bearing mounted adjacent one end of a rotor shaft thereof and a pusher screw mounted on one side wall of the frame of the condenser for pushing the bearing into a corresponding opening in the opposite side wall of the condenser frame, said opening having a keyhole shape with the bearing-receiving portion having a larger diameter than the width of the slotted keyway portion, said method comprising the steps of:

mounting said rotor shaft carrying a plurality of rotor blades on an assembly jig;

mounting a plurality of stator blades on said jig in spaced relation to said rotor blades;

mounting said condenser frame on said jig so that said rotor shaft engages said opening at the end adjacent said bearing and said pusher screw at the opposite end;

tightening said screw to seat and hold said bearing in the bearing-receiving portion of said opening; and connecting said stator blades to terminals provided on said frame.

* * * * *